United States Patent
Srivastava et al.

(10) Patent No.: US 12,382,428 B2
(45) Date of Patent: Aug. 5, 2025

(54) PAGING ENHANCEMENTS FOR SINGLE-SIM AND MULTI-SIM DEVICES

(71) Applicant: QUALCOMM Incorporated, San Diego, CA (US)

(72) Inventors: Akash Srivastava, Hyderabad (IN); Tanay Kabra, Hyderabad (IN); Rajeev Kumar, Bangalore (IN); Rajesh Nadava, Hyderabad (IN); Harinath Reddy Patel, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 661 days.

(21) Appl. No.: 17/729,727

(22) Filed: Apr. 26, 2022

(65) Prior Publication Data

US 2023/0345413 A1    Oct. 26, 2023

(51) Int. Cl.
*H04W 68/00*    (2009.01)
*H04B 17/336*    (2015.01)
*H04W 8/24*    (2009.01)

(52) U.S. Cl.
CPC ........ *H04W 68/005* (2013.01); *H04B 17/336* (2015.01); *H04W 8/24* (2013.01)

(58) Field of Classification Search
CPC ..... H04W 68/005; H04W 8/24; H04B 17/336
See application file for complete search history.

(56) References Cited

U.S. PATENT DOCUMENTS

| | | |
|---|---|---|
| 2014/0010139 A1 | 1/2014 | Choi et al. |
| 2017/0026985 A1* | 1/2017 | Lindoff ............. H04W 72/1215 |
| 2017/0265114 A1 | 9/2017 | Sahu et al. |
| 2017/0289889 A1* | 10/2017 | Sahu ...................... H04W 24/10 |
| 2021/0267000 A1* | 8/2021 | Jain ........................ H04W 8/245 |
| 2022/0353774 A1* | 11/2022 | Agarwal ............... H04W 36/08 |
| 2023/0112465 A1* | 4/2023 | Vadapalli ............... H04W 76/15 |
| | | 370/329 |

FOREIGN PATENT DOCUMENTS

WO    2021018146 A1    2/2021

OTHER PUBLICATIONS

Partial International Search Report—PCT/US2023/065089—ISA/EPO—Jun. 20, 2023.
International Search Report and Written Opinion—PCT/US2023/065089—ISA/EPO—Aug. 10, 2023.

* cited by examiner

*Primary Examiner* — Sulaiman Nooristany
(74) *Attorney, Agent, or Firm* — Patterson & Sheridan, LLP

(57) ABSTRACT

Certain aspects of the present disclosure provide techniques for merging pages in communications systems using carrier aggregation (CA) or secondary component carriers (SCCs). An example method that may be performed by a user equipment (UE) includes: operating in a connected mode using a default data subscription (DDS) associated with a primary cell (PCell); detecting one or more secondary cells (SCells) associated with the DDS are configured for operating in the connected mode; and decoding one or more paging messages using at least a secondary component carrier (SCC) associated with a first SCell of the one or more SCells.

12 Claims, 10 Drawing Sheets

PAGING ENHANCEMENTS FOR SINGLE-SIM AND MULTI-SIM DEVICES

BACKGROUND

Field of the Disclosure

Aspects of the present disclosure relate to wireless communications, and more particularly, to techniques for paging enhancements for single-subscriber identification module (SIM) devices and multi-SIM devices.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method generally includes operating in a connected mode using a default data subscription (DDS) associated with a primary cell (PCell); detecting one or more secondary cells (SCells) associated with the DDS are configured for operating in the connected mode; and decoding one or more paging messages using at least a secondary component carrier (SCC) associated with a first SCell of the one or more SCells.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
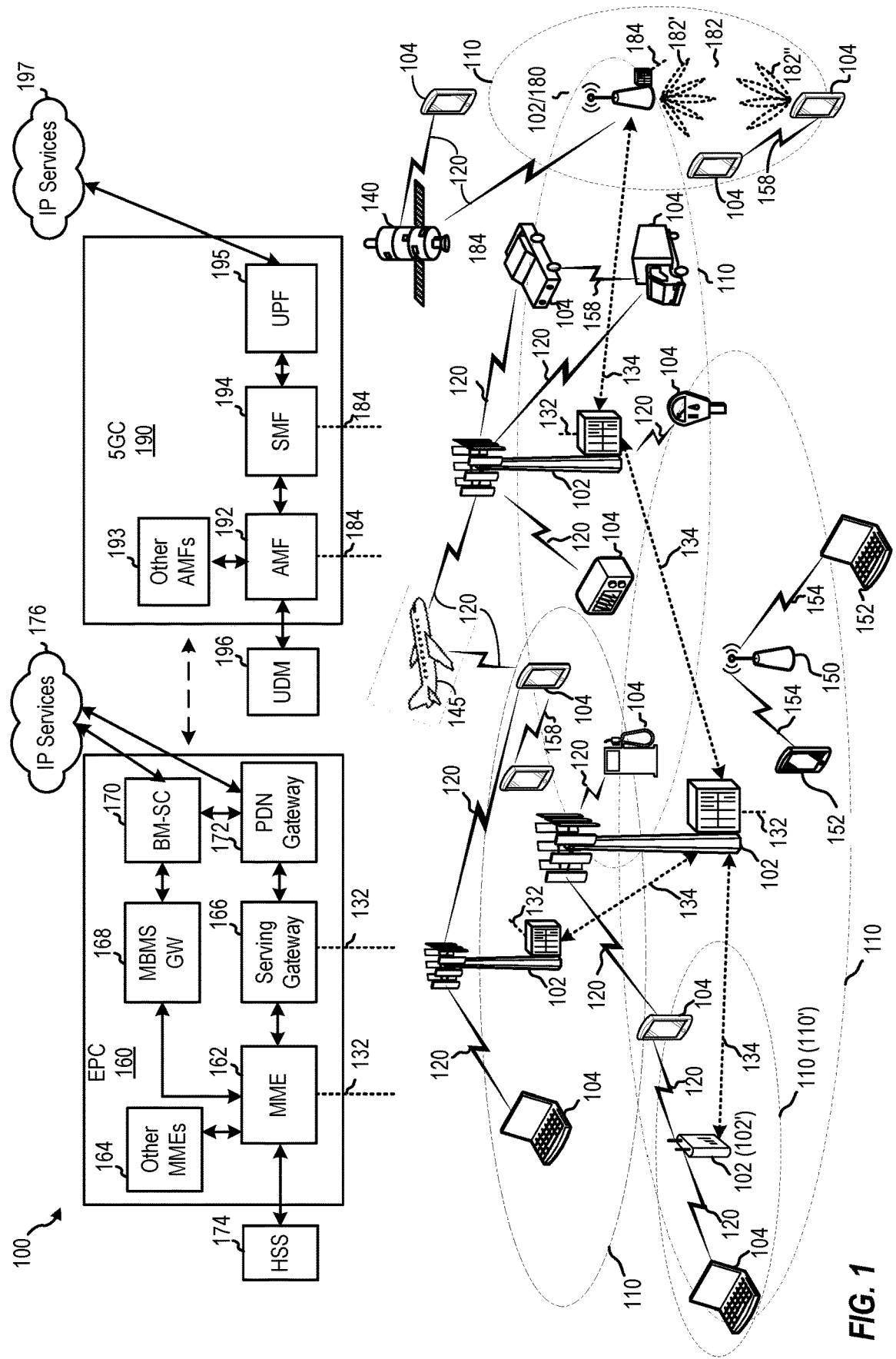
FIG. 1 depicts an example wireless communications network.

Aspects of the present disclosure provide apparatuses, methods, processing systems, and computer-readable mediums for paging enhancements for single-subscriber identification module (SIM) devices and multi-SIM devices.

Paging performance (e.g., percentage of pages detected and decoded in poor signal conditions) is among the most important key performance indicators (KPIs) for a UE, as paging performance directly impacts end user experience. Single-SIM UEs and multi-SIM UEs in which the multiple SIMS are associated with different operators can have poor paging performance when radio frequency (RF) conditions are poor. For example, interference on a primary component carrier (PCC) may cause such a UE to miss (e.g., fail to detect or fail to decode) pages intended for the UE, negatively impacting the UE's paging performance.

In some cases, when operating with multiple SIMS, a first SIM may be associated with a default data subscription (DDS) and a second SIM may be associated with a non-default data subscription (nDDS), which may share RF resources of a UE. When the shared RF resources are being used by one SIM (e.g., to support a data call) on a first frequency band and a paging occasion (PO) occurs for another SIM, the UE may cause the shared RF resources to tune away from the first frequency band to a second frequency band to listen for pages during the PO. In some cases, the UE will not tune away the shared RF resources (e.g., to avoid affecting the data call), and the UE may miss a page during that PO.

When both SIMS are associated with the same operator and share RF resources of the UE, the UE may avoid tuning away by performing page merging, involving the UE listening for pages for the nDDS using the DDS. However, if a PCC of the DDS does not include a paging search space, then the UE may not be able to perform page merging and may, instead, have to perform a tune away to listen for pages for the nDDS.

Therefore, aspects of the present disclosure provide techniques for helping to improve paging performance. In some cases, these techniques may include using a secondary component carrier (SCC) to decode pages, for example, when channel conditions on the PCC are poor or when a bandwidth part (BWP), of a primary serving cell (PCell) associated with the PCC, does not overlap with a paging search space. In some cases, the UE may have only a single SIM, and superior signal conditions of the SCC over the PCC may cause the UE to determine to attempt to decode pages on the SCC. In some other cases, the UE may have two or more SIMS including a first SIM associated with a DDS of the UE and a second SIM associated with a nDDS, signal conditions on a PCC and the SCC may cause the UE to be more successful decoding pages on the SCC than on the PCC, and the UE may determine to attempt to decode pages on the SCC based on those signal conditions. In some other cases, the UE may have two or more SIMs including a first SIM associated with a DDS of the UE and a second SIM associated with a nDDS, and a paging search space may not be configured within the PCC so that decoding the pages on the SCC allows the UE to decode pages without tuning-away to decode pages in another frequency band.

A UE implementing aspects of the present disclosure may have improved reliability in receiving pages, save power as compared to UEs not implementing aspects of the present disclosure, and gain throughput as compared to devices not implementing aspects of the present disclosure. The UE may save power by not performing tune aways, which cause the UE to consume extra power because the UE performs additional processing to perform a tune away. The UE may gain throughput because, when the UE tunes away from a data call, the network may reduce the data rate of the call (e.g., by reducing the coding rate), which may then take some time to ramp the data rate of the call back up to a peak data rate after the tune away.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
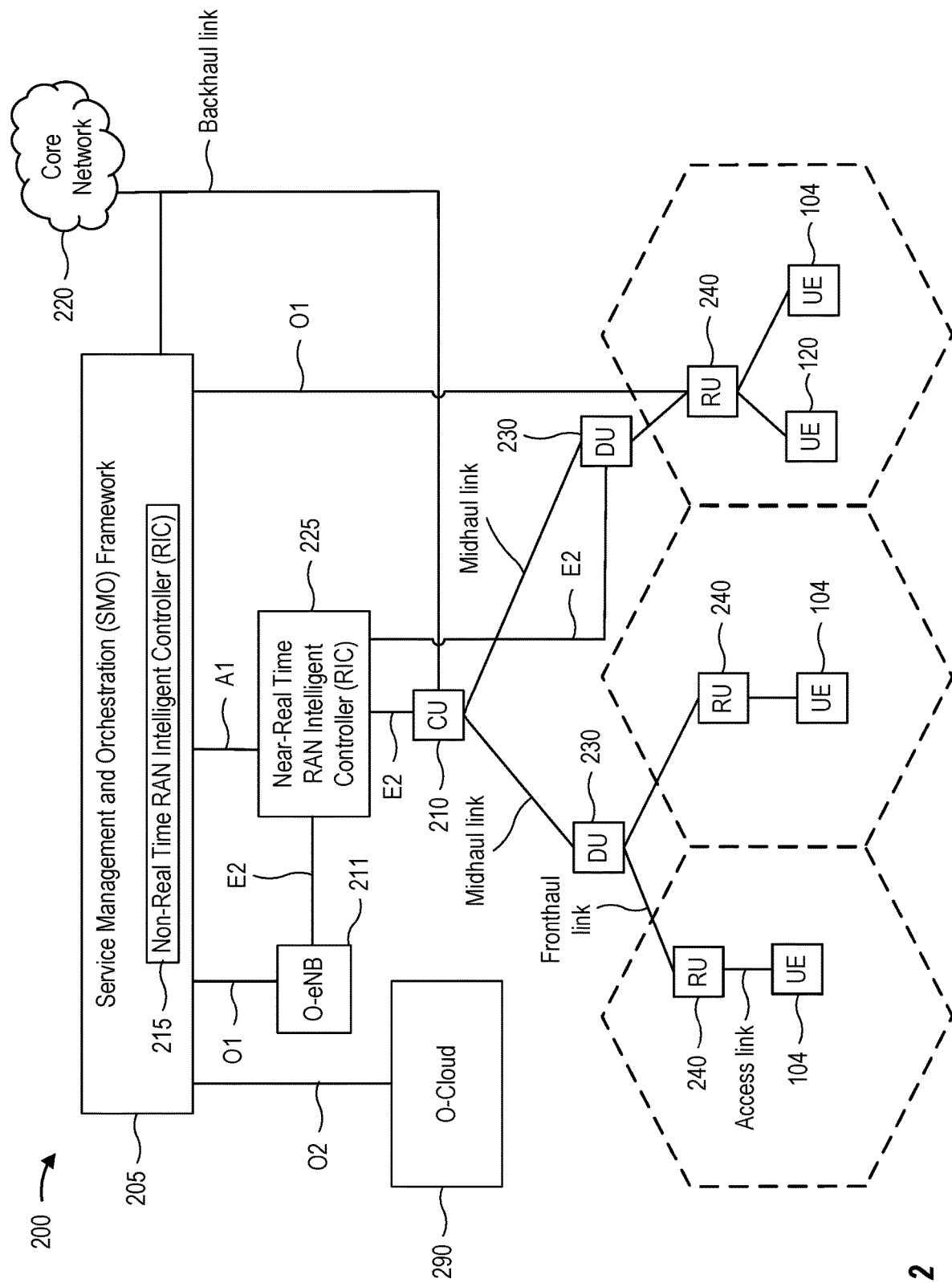
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may also receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
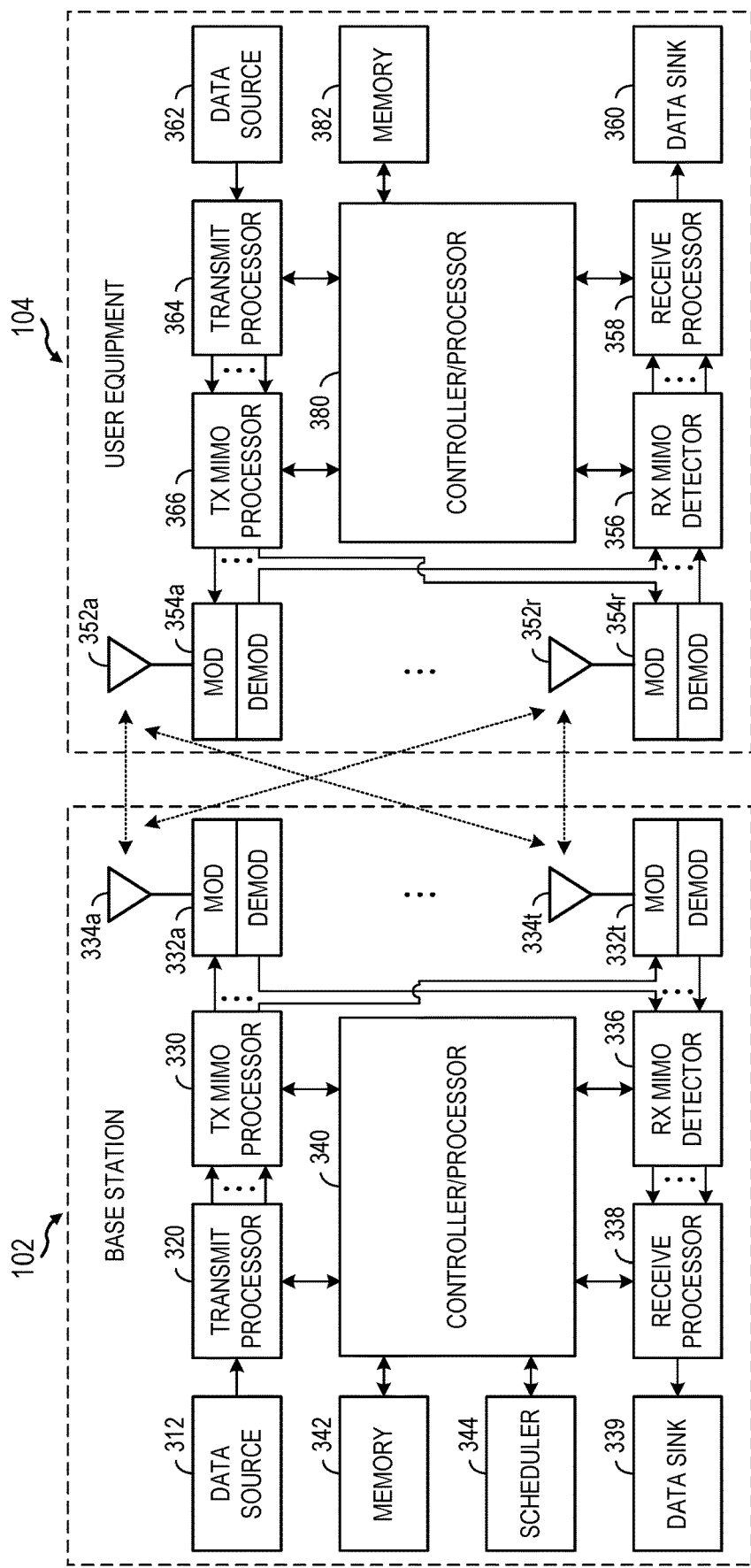
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
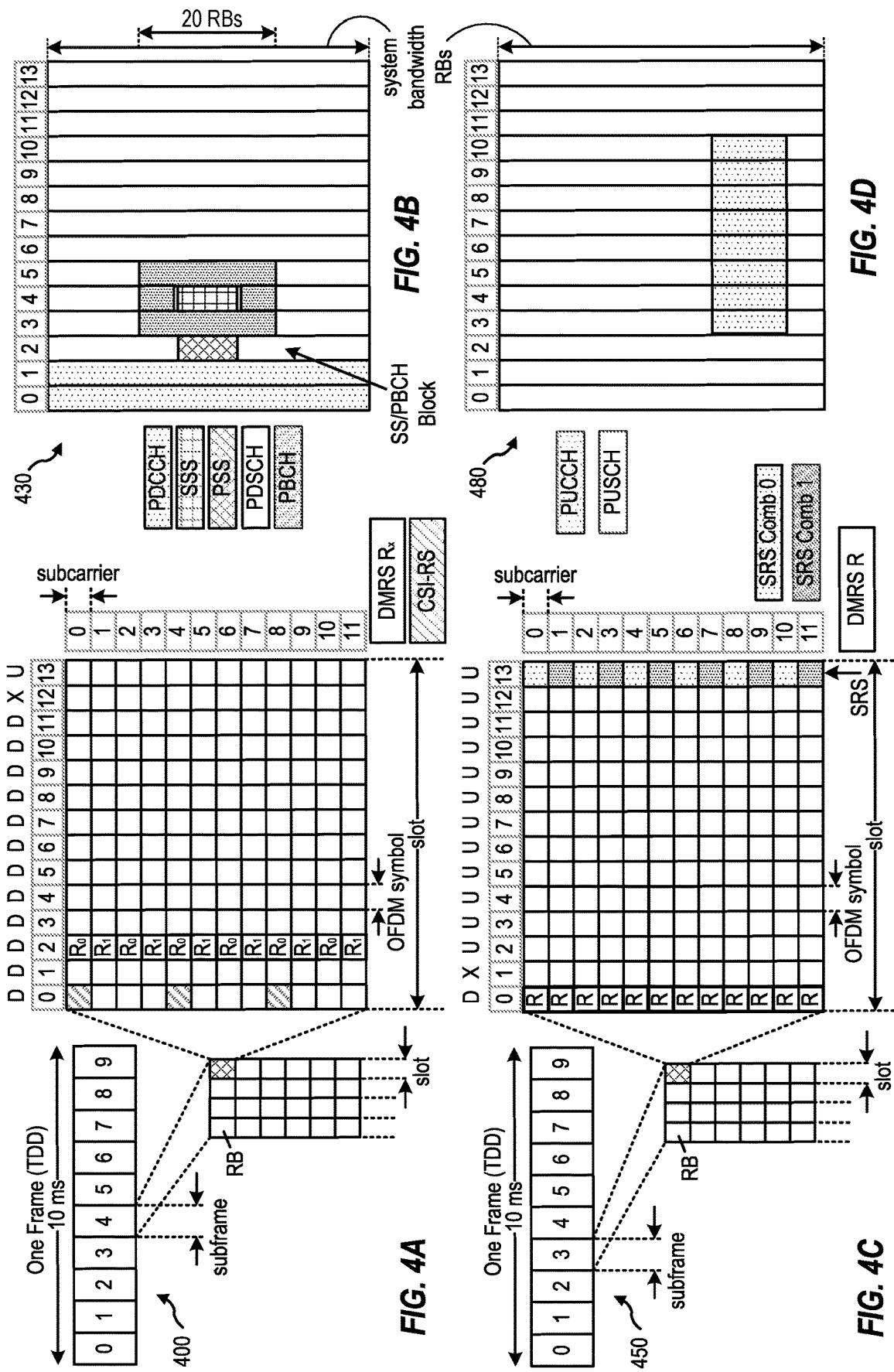
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Paging Improvements for Single-SIM and Multi-SIM Devices

Paging performance (e.g., percentage of pages detected and decoded in poor signal conditions) is among the most important key performance indicators (KPIs) for a UE, as paging performance directly impacts end user experience. Pages may be decoded in both RRC connected and idle states for Earthquake and Tsunami Warning System (ETWS) activities, Commercial Mobile Alert System (CMAS) activities, and mobile terminated activities.

In multiple subscriber identification module (multi-SIM) UEs, paging performance may be negatively impacted due to RF resource sharing in dual receive scenarios. For example, in some cases, when operating with multiple SIMS, a first SIM of a UE may be associated with a default data subscription (DDS) that is configured to operate primarily in a connected mode of operation on a first frequency band while a second SIM of the UE may be associated with a non-default data subscription (nDDS) and may be configured to operate in an idle mode of operation on a second frequency band when not being actively used. In such cases, while the DDS of the first SIM operates in the connected mode and the nDDS of the second SIM operates in the idle mode, the DDS of the first SIM and the nDDS of the second SIM may share RF resources (e.g., transmit and receive chains) of the UE. As such, because RF resources are shared between the DDS of the first SIM and the nDDS of the second SIM, tune aways may be required from the first frequency band associated with the DDS of the first SIM to receive pages or other information for the nDDS of the second SIM on the second frequency band.

When shared RF resources are being used by a first SIM (e.g., to support a data call for the DDS) on a first frequency band and a paging occasion (PO) occurs for a second SIM, the UE may not tune away the shared RF resources (e.g., to avoid affecting the data call), resulting in the UE not attempting to detect pages for the second SIM during that PO. The UE will of course miss any pages transmitted during that PO, and thus a UE that performs tune aways due to sharing RF resources between SIMs may have decreased paging performance, compared to a UE that can receive pages without performing tune aways. And even when the UE does tune away the shared RF resources from the first frequency band to a second frequency band to listen for the pages, the UE can miss a page during the PO. The UE may, for example, have a timing mismatch with the paging base station and miss a page for the nDDS that the UE would have received if the shared RF resources had been receiving on the second frequency band instead of being tuned to the first frequency band for the DDS. Moreover, during a tune away, both of the involved subscriptions (e.g., both the subscription being tuned away from and the subscription being tuned away to) are active simultaneously, and power consumption of the UE increases, as more components of the UE are active when both subscriptions are active.

In addition, a multiple SIM UE that performs a tune away while performing a data call on the first frequency band (e.g., to receive a page on the second frequency band) may experience reduced throughput for the call because, when the UE tunes away from the first frequency band, the network (e.g., a base station or other network entity) may reduce the data rate of the call (e.g., by reducing a coding rate of the call) negatively affecting quality of the call. Moreover, after retuning to the first frequency band, it may take a significant amount of time for the network to increase the data rate for the call.

To help alleviate the issues described above related to having to perform tune aways when multiple SIMs share RF resources, a multi-SIM UE may use the DDS associated with a first SIM to perform idle mode activities (e.g., receive a page) for the nDDS associated with a second SIM. In some cases, these techniques may be known as "page merging". For page merging to be successful, the DDS may need to be associated with a bandwidth part (BWP) that includes a paging search space in order to receive pages for the nDDS. This technique may improve page performance for both subscriptions, as all of the RF resources of the UE are available to the DDS and none of the RF resources of the UE are required to be tuned away to listen for pages for the nDDS.

In some cases, fifth generation (5G) new radio (NR) communications systems may deploy different BWPs to serve communications devices. For example, usage of BWPs may result in improvements of tuning the devices (e.g., for devices that find it easier to tune to a BWP instead of the entire bandwidth of the system) and improve decoding performance, as a device may not decode an entire bandwidth in a cell. In some cases, a cell of a 5G NR communications system may have two BWPs: one BWP used for idle mode operations of a UE and another BWP used for connected mode operations of the UE. In some cases, a paging search space may be maintained in the BWP used for idle mode operations, while the BWP used for connected mode operations may or may not include the paging search space.

In some cases, when the paging search space in not configured in the BWP associated with the DDS used for connected mode operations, then page merging (e.g., using the DDS to receive pages for the nDDS) and other idle mode activities associated with the nDDS may not be implemented using the DDS, as pages for the nDDS are expected to be received in the paging search space, which is not configured in the BWP associated with the DDS. In such cases, a multi-SIM UE may follow legacy techniques (e.g., dual SIM dual standby (DSDS)) involving the sharing of RF resources between the DDS and the nDDS causing the UE to retune the shared RF resources from the connected mode BWP associated with the DDS to the idle mode BWP associated with the nDDS so that the nDDS can listen for pages in the paging search space. In these cases, the power consumed by the UE may be higher and, due to periodic sharing of RF resources between the subscriptions, there may be some degradation of throughput for the DDS and/or the nDDS.

Figure 5:
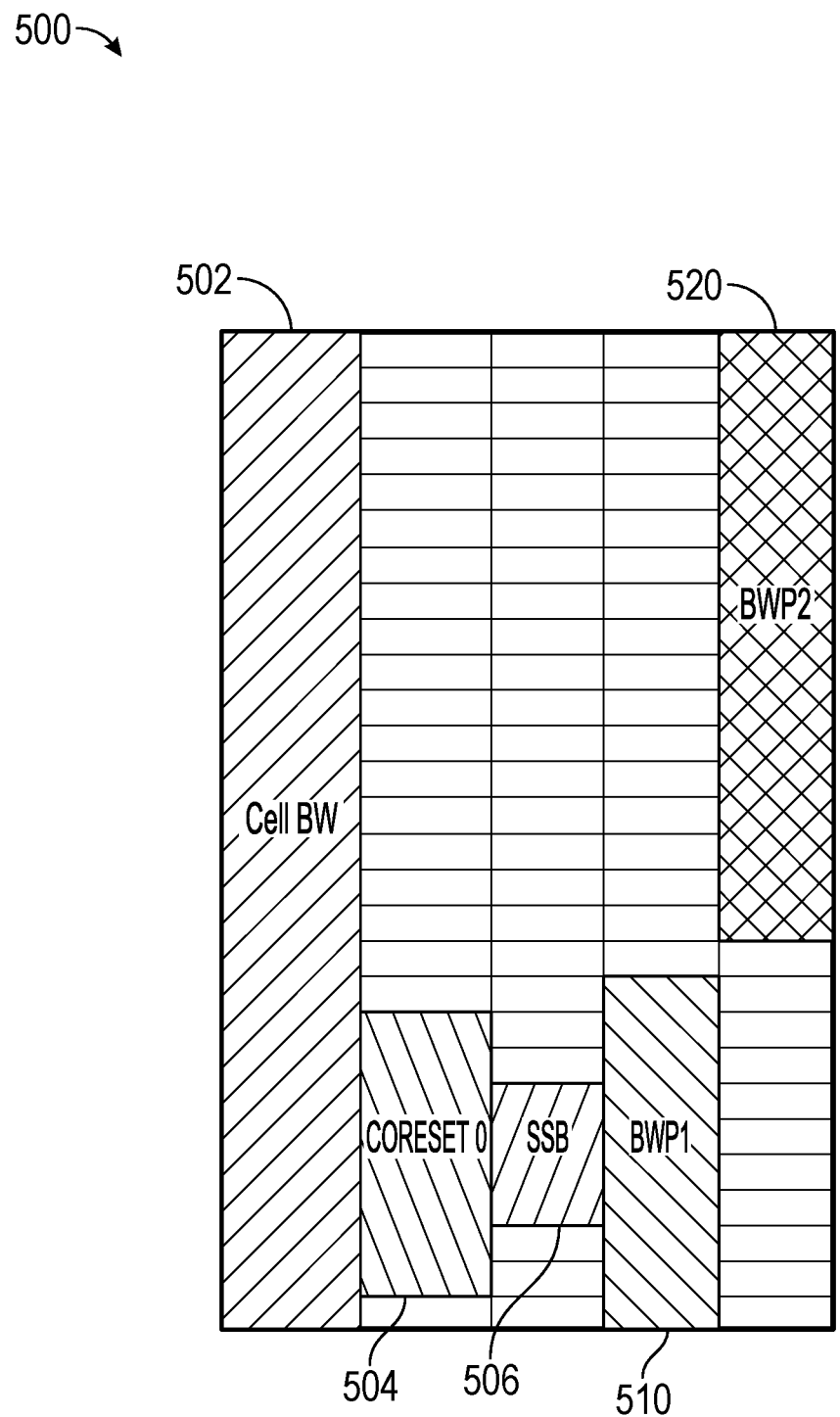
FIG. 5 depicts an example bandwidth configuration, in accordance with aspects of the present disclosure.

FIG. 5 depicts an example bandwidth allocation 500 in which a paging search space is not configured within a BWP of a PCell associated with a DDS. In the example bandwidth allocation 500, a cell (e.g., cell 110, shown in FIG. 1) may be associated with a bandwidth 502. As shown, two BWPs 510 and 520 are defined within the cell bandwidth 502. The first BWP 510 (also labeled "BWP1") overlaps with a paging search space 504 (e.g., control resource set (CORESET) zero) and with synchronization signal block (SSB) subband 506. Further, as shown, the second BWP 520 (also labeled "BWP2") does not overlap with the paging search space 504. As a result, in some cases, when a UE is configured for connected mode operations associated with a DDS using the second BWP 520 on a PCell, page merging for a nDDS may not be performed by the UE using the second BWP 520 since the second BWP 520 does not include or overlap with the paging search space 504.

To help resolve these issues with performing page merging for a nDDS when a UE is configured to communicate using a DDS on a BWP of a PCell that does not overlap with a paging search space, the UE may instead use a secondary cell (SCell) configured for the DDS that has a BWP that overlaps with the paging search space to receive pages for the nDDS. For example, in some cases, one or more SCells may be configured for communicating with the DDS. In some cases, when a BWP of one of the configured SCells associated with the DDS overlaps with the paging search space, a secondary component carrier (SCC) associated with this SCell may be used to receive pages and perform other idle mode operations associated with the nDDS, avoiding tune aways of the RF resources shared between the DDS and nDDS. The UE may then perform idle mode operations for the nDDS with the DDS using the SCell to which the nDDS is reselected.

More specifically, for example, in some cases, one or more SCells may be configured for the DDS. When the BWP of the PCell does not overlap with a paging search space, the UE may determine whether a BWP associated with any of the configured SCells overlaps with the paging search space. In some cases, the UE may determine whether a BWP of an SCell configured for the DDS overlaps with the paging search space based on a system information block (SIB) (e.g., SIB1) associated with the SCell. For example, in some cases, the UE may receive SIB1 from each of the one or more SCells configured for the DDS and determine which of the SCells have a BWP that overlaps with the paging search space. If any one of the SCells have a BWP that overlaps with the paging search space, the UE can receive and decode pages of the nDDS using an SCC associated with the SCell of the DDS by making the nDDS reselect to the SCell of the DDS having the BWP that overlaps with the paging search space.

Figure 6:
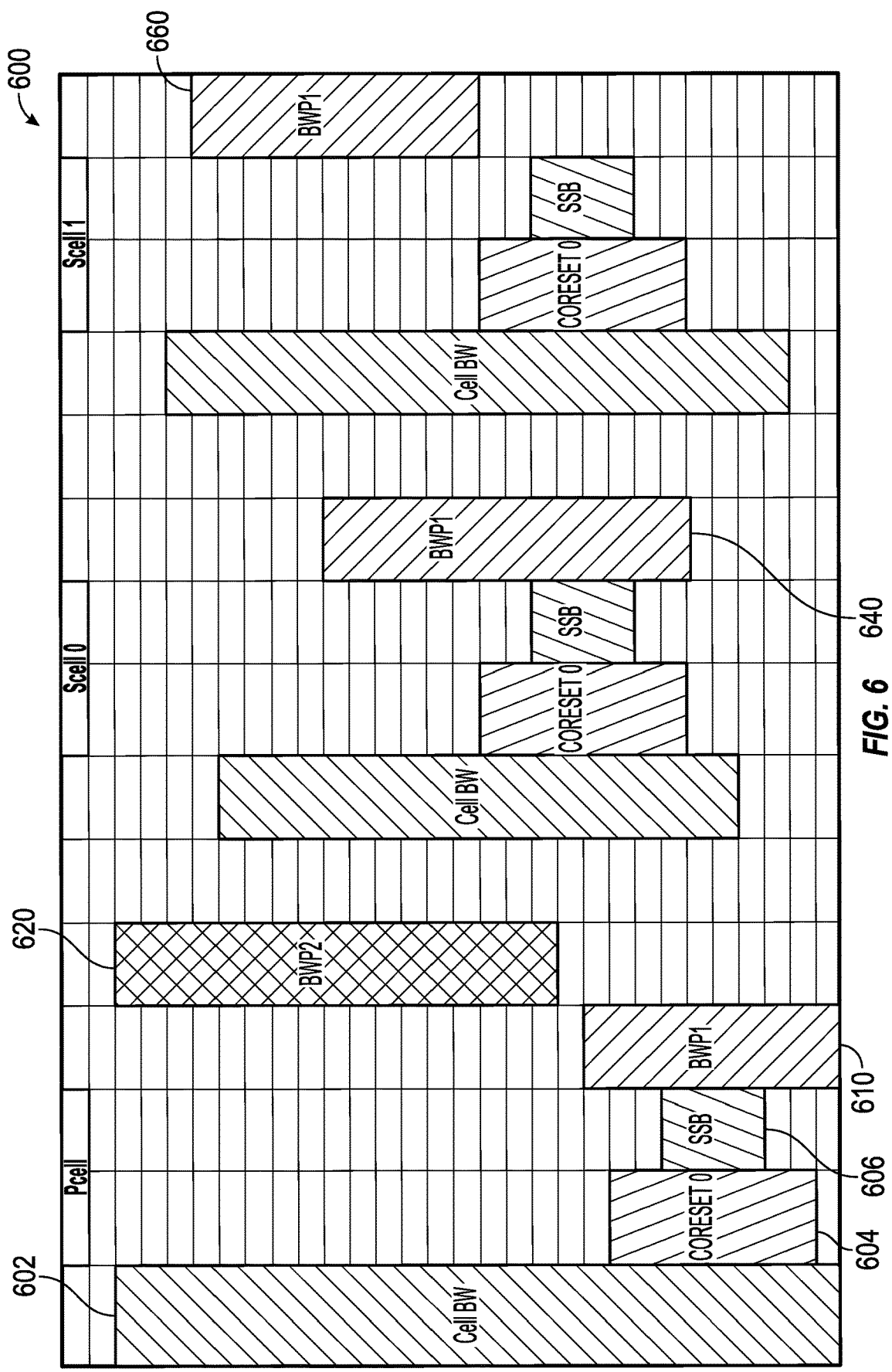
FIG. 6 depicts an example bandwidth configuration, in accordance with aspects of the present disclosure.

FIG. 6 shows an example bandwidth configuration 600 in which a paging search space is configured within a BWP of an SCell associated with a DDS. In the example bandwidth allocation 600, a cell (e.g., cell 110, shown in FIG. 1) may be associated with a bandwidth 602. As shown, two BWPs 610 and 620 are defined within the cell bandwidth 602. The first BWP 610 (also labeled "BWP1") overlaps with a paging search space 604 (e.g., CORESET zero) and with an SSB 606. Further, as shown, the second BWP 620 (also labeled "BWP2") does not overlap with the paging search space 604. As a result, in some cases, when a UE is configured for connected mode operations associated with a DDS using the second BWP 620 on a PCell, page merging may not be performed by the UE using the second BWP 620 since the second BWP 620 does not include or overlap with the paging search space 604.

There are two SCells for the DDS of the UE configured. The first SCell, SCell0, has a BWP 640 (also labeled "BWP1") that includes CORESET 0 of the SCell. The second SCell, SCell1, has a BWP 660 that does not include CORESET 0.

As discussed above, to help resolve these issues with performing page merging for a nDDS when a UE is configured to communicate using a DDS on a BWP of a PCell that does not overlap with a paging search space, the UE may instead use an SCell configured for the DDS that has a BWP that overlaps with the paging search space to receive pages for the nDDS. For example, when a UE has a DDS and a nDDS associated with a same network operator and the DDS is associated bandwidth 602, the nDDS of the UE may reselect to the first SCell, SCell0, and all the idle mode activities of the nDDS may be performed on the first SCell, SCell0. The idle mode activities of the nDDS performed by the DDS on the first SCell may include receiving, demodulating, and decoding pages.

According to aspects of the present disclosure, if more than one SCell has a paging search space within the BWP of that SCell, then the UE may cause the nDDS to reselect to the SCell having a largest BWP bandwidth.

In aspects of the present disclosure, if the SCell having the paging search space within the BWP of that SCell is in a deactivated state, then the UE may receive PDCCHs on the SCell during the paging occasion of the nDDS and attempt to decode the PDCCHs with a paging radio network temporary identifier (P-RNTI) of the nDDS.

According to aspects of the present disclosure, if the SCell having the paging search space within the BWP of that SCell is in an activated state and does not use cross-carrier scheduling, then the UE may attempt to decode all PDCCHs on the SCell, and the UE may attempt to decode PDCCHs received during the paging occasion of the nDDS using a P-RNTI of the nDDS sub, in addition to radio network temporary identifiers (RNTIs) of the DDS.

In aspects of the present disclosure, if the SCell having the paging search space within the BWP of that SCell is in an activated state and uses cross-carrier scheduling, then the UE may receive all PDCCHs transmitted in the SCell, but only attempt to decode PDCCHs received during the paging occasion of the nDDS using a P-RNTI of the NDDS.

A UE implementing aspects of the present disclosure may both save power and improve throughput as compared to UEs not implementing aspects of the present disclosure. For example, the UE may save power by not performing tune aways, which would otherwise cause the UE to consume extra power due to additional processing required to perform a tune away. Further, throughput may be improved because, when the UE would otherwise tune away from a call, the network would reduce the data rate of the call (e.g., by reducing the coding rate).

The techniques described above of a multi-SIM UE using a DDS to perform idle activities for a nDDS (e.g., when both subscriptions are associated with a same network operator) have limitations, such as when the DDS is camped on a PCell with poor RF conditions that may result in the multi-SIM UE missing pages for the nDDS. In such cases, merging pages of the nDDS with the DDS may not be optimal and paging performance may be negatively impacted due to the poor RF conditions on the PCell of the DDS. In such cases, the paging performance of both subscriptions might be negatively impacted when merging pages.

Similarly, poor RF conditions on the PCell may negatively affect paging performance in other scenarios, such as when a UE only include a single SIM or when the UE includes two SIMs associated with different operators (and cannot perform page merging). For example, in either case, the UE may be configured to receive paging messages for a DDS (e.g., associated with the single SIM or one of the two SIMS associated with the different operators) using a primary component carrier (PCC) associated with a PCell. When RF conditions, such as a signal to noise ratio (SNR), on the PCC are poor (e.g., below an SNR threshold), these poor RF conditions may cause the UE to improperly receive one or more pages for the DDS or to not receive the one or more pages at all.

To help avoid these issues with improperly receiving/missing one or more pages for a DDS when RF conditions of a PCC associated with a PCell are poor, rather than only attempting to receive the one or more pages using the PCC, the UE may instead use an SCC associated with an SCell that has a same tracking area code (TAC) as the PCell to receive the one or more pages for the DDS in combination with the PCC associated with the PCell. In other words, the UE may use both the PCC associated with the PCell and an SCC associated with an SCell to attempt to receive and decode one or more pages for the DDS.

Similar techniques may also apply to receiving one or more pages for a nDDS. For example, if one or more SCells are configured for the nDDS and RF conditions on a PCC of a PCell associated with the nDDS are poor, the UE may attempt to use an SCC associated with one or more of the SCells having a same TAC as the PCell in combination with the PCC of the PCell to receive and decode the one or more pages for the nDDS.

In some cases, the techniques of using the SCC to receive one or more pages for a DDS or nDDS may improve reliability in receiving pages. For example, a UE may have improved reliability in receiving pages because the UE can attempt to decode pages on an SCC in addition to attempting to decode pages on a PCC. Attempting to decode pages on the SCC may enable to the UE to successfully decode a page that the UE could not decode only using the PCC.

Example Flow Diagram Illustrating Paging Improvements for Single-SIM and Multi-SIM Devices As noted above, aspects of the present disclosure provide techniques for helping to improve paging performance for single-SIM and multi-SIM devices/UEs. For example, in some cases (e.g., when a UE only includes a single SIM or includes two SIMs associated with different operators), these techniques may include using an SCC associated with an SCell of a DDS to decode pages associated with the DDS, for example, when channel conditions on a PCC associated with a PCell of the DDS are poor. In other cases (e.g., when the UE includes two SIMs associated with a same operator, the techniques presented herein may include using an SCC associated with an SCell of a DDS to decode pages associated with a nDDS, such as when a BWP of the PCell does not overlap with a paging search space.

Figure 7:
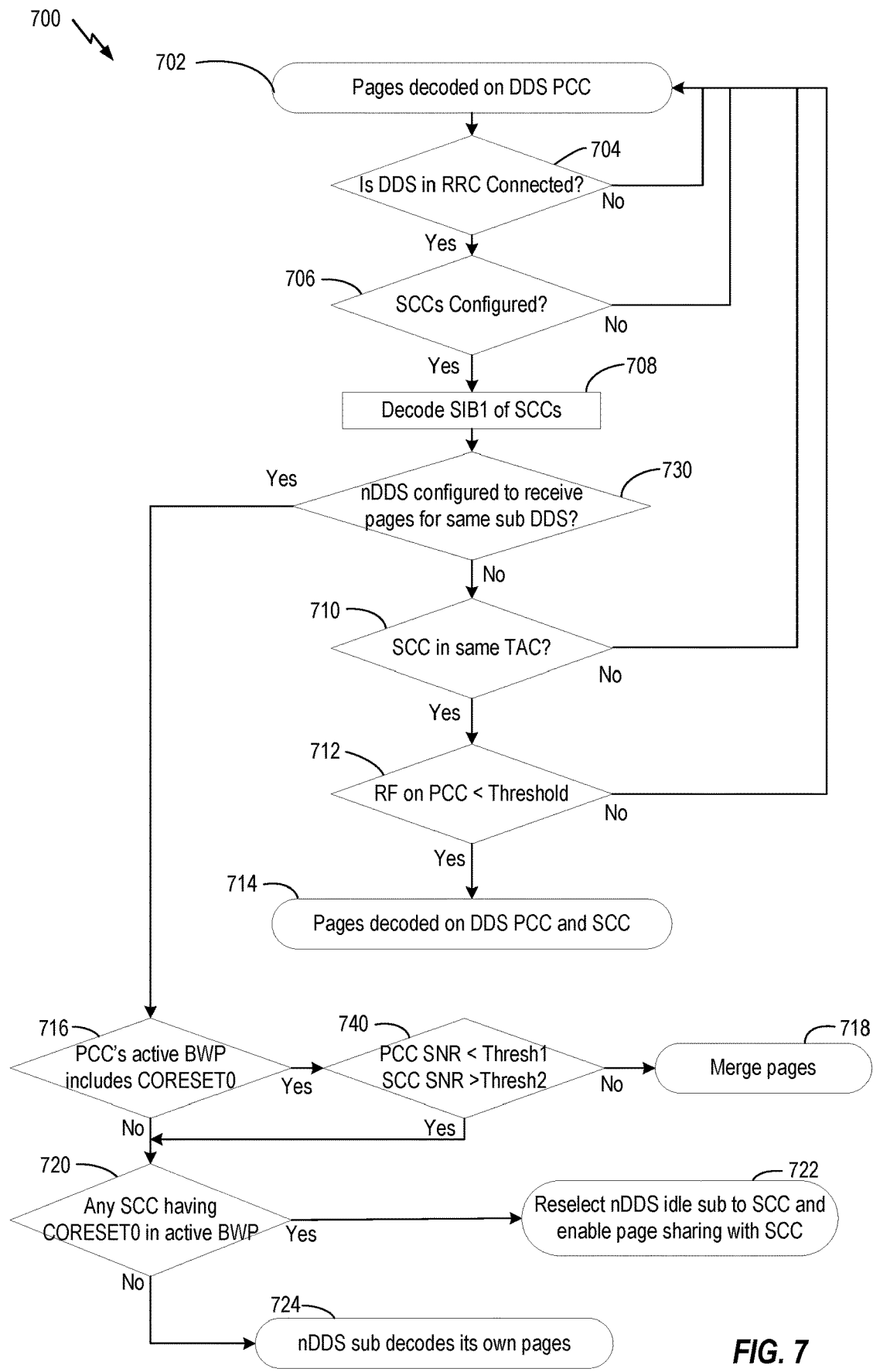
FIG. 7 depicts a flow diagram of example operations that may be performed by a user equipment (UE), in accordance with aspects of the present disclosure.

FIG. 7 depicts a flow diagram illustrating an example algorithm 700 for performing wireless communications, according to aspects of the present disclosure. In some cases, one or more aspects of the algorithm 700 may be performed by a UE, such the UE 104 (shown in FIG. 1) and/or UE 804 (shown in FIG. 8).

As shown, at 704, the UE determines whether a DDS of the UE is in RRC Connected (also referred to as RRC Connected) mode. If the UE is not in RRC Connected mode, then the algorithm 700 proceeds to 702, and the UE decodes pages on the DDS PCC. If, however, the UE is in RRC Connected mode, then the algorithm proceeds to 706, and the UE determines if any SCCs are configured for the UE. If no SCCs are configured for the UE, then the algorithm 700 proceeds to 702, and the UE decodes pages on the DDS PCC. If SCCs are configured for the UE, then the algorithm 700 proceeds to 708 with the UE decoding SIB1 (which may, for example, be received at 808, shown in FIG. 8) of each of the configured SCCs.

The algorithm 700 then proceeds to 730, where the UE determines whether a nDDS of the UE is configured to receive pages for the DDS and is associated with a same network operator as the DDS. If no nDDS of the UE is both configured to receive pages for the DDS and associated with a same network operator as the DDS (e.g., the UE has no nDDS, or the UE has a nDDS associated with a different network operator as the DDS), then the algorithm proceeds to 710.

At 710, the UE determines whether any SCC configured for the UE has a same TAC as the PCC. If no SCCs configured for the UE have a same TAC as the PCC (e.g., all SCCs are from a different tracking area than the PCC), then the algorithm proceeds to 702, and the UE decodes pages on the DDS PCC. If, however, one or more SCCs configured for the UE has a same TAC as the PCC, then the algorithm proceeds to 712.

Thereafter, at 712, the UE determines whether the signal quality (e.g., an SNR) on the PCC is lower than a threshold. If the signal quality on the PCC is greater than or equal to the threshold, then the algorithm proceeds to 702, and the UE decodes pages on the DDS PCC. If the signal quality on the PCC is less than the threshold, then the algorithm proceeds to 714, and the UE attempts to decode pages received on both the PCC and the SCC that has the same TAC as the PCC.

If, at 730, the UE determines that a nDDS of the UE is both configured to receive pages for the DDS and associated with a same network operator as the DDS, then the algorithm proceeds to 716 with the UE determining whether an active BWP of the PCC includes CORESET0 (i.e., includes the paging search space). If the UE determines that an active BWP of the PCC includes CORESET0, then the algorithm proceeds to 740, and the UE determines whether SNR for the PCC is less than a first threshold and SNR for the SCC is greater than a second threshold, indicating that signal conditions on the PCC are poor and that signal conditions on the SCC are good enough that the UE may improve its page performance by decoding pages on the SCC. If the UE determines that SNR for the PCC is greater than or equal to the first threshold or SNR for the SCC is less than or equal to the second threshold, then the algorithm proceeds to 718 with the UE merging pages by using the PCC of the DDS to receive pages for the nDDS.

If, at 716, the UE determines that no active BWP of the PCC includes CORESET0, then the algorithm 700 proceeds to 720 with the UE determining whether an active BWP of any SCC configured for the UE includes CORESET0. The algorithm 700 also proceeds to 720 if, at 740, the UE determines that SNR for the PCC is less than the first threshold and SNR for the SCC is greater than the second threshold. If, at 720, the UE determines that an active BWP of an SCC configured for the UE includes CORESET0, then the algorithm 700 proceeds to 722 with the UE reselecting the idle nDDS to the SCC having an active BWP that includes CORESET0. The UE then attempts to decode pages for the nDDS received on the SCC using the DDS.

If, at 720, the UE determines that no SCC configured for the UE has an active BWP that includes CORESET0, then the algorithm proceeds to 724, with the nDDS attempting to decode its own pages and the DDS attempting to decode its own pages.

Example Operations of Entities in a Communications Network

Figure 8:
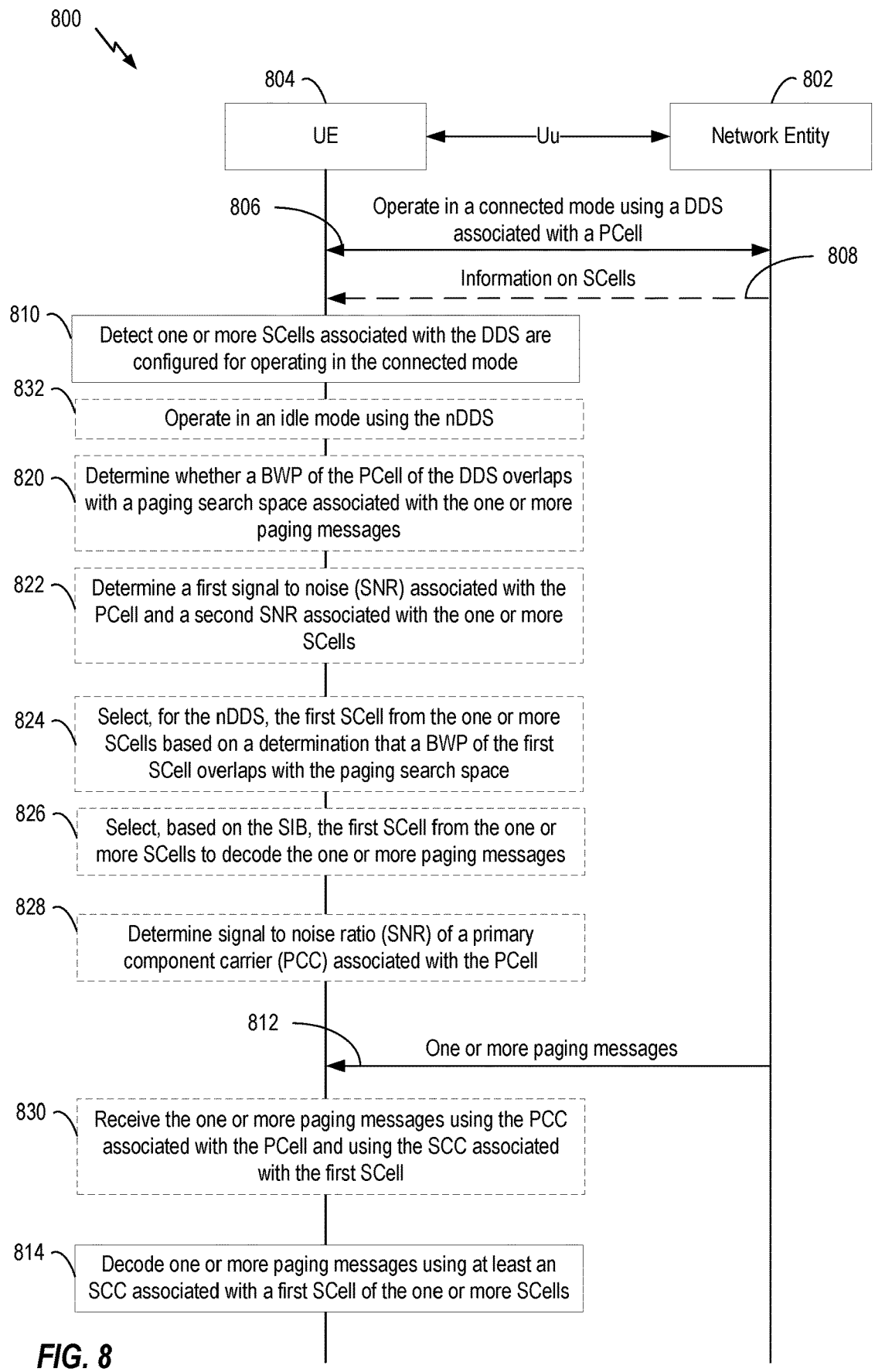
FIG. 8 depicts a process flow for communications in a network between a UE and a network entity, in accordance with aspects of the present disclosure.

FIG. 8 depicts a process flow 800 for communications in a network between a network entity (NE) 802, a user equipment (UE) 804. In some aspects, the NE 802 may be an example of a base station, such as the BS 102 depicted and described with respect to FIGS. 1 and 3 or a disaggregated base station as described with respect to FIG. 2. Similarly, the UE 804 may be an example of UE 104 depicted and described with respect to FIGS. 1 and 3. However, in other aspects, UE 804 may be another type of wireless communications device and NE 802 may be another type of network entity or network node, such as those described herein. NE 802 and UE 804 may communicate via a Uu interface, as illustrated.

At 806, the UE 804 operates in a connected mode using a DDS associated with a primary cell (PCell) associated with the NE 802. In some cases, the UE 804 may be connected in a call via the PCell.

At 808, the UE 804 optionally receives information regarding secondary cells (SCells) of the NE 802 that are associated with the DDS. The UE 804 may, for example, receive the information regarding SCells in a system information block (SIB) transmitted by the NE 802.

At 810, the UE 804 detects one or more secondary cells (SCells) associated with the DDS are configured for operating in the connected mode. The UE may, for example, be configured by the network entity to perform a call via one of the SCells.

At 812, the UE 804 receives one or more paging messages transmitted from the NE 802.

At 814, the UE 804 decodes one or more paging messages using at least a secondary component carrier (SCC) associated with a first SCell of the one or more SCells.

In some cases, the UE 804 includes at least a first SIM and a second SIM, the first SIM is associated with the DDS and the second SIM is associated with a non-default data subscription (nDDS), and the DDS and the nDDS are associated with a same network operator. That is, the UE 804 may be a multi-SIM UE, with one SIM associated with the DDS and another SIM associated with a nDDS. In some cases, the UE 804 operates in an idle mode using the nDDS, as shown at 832. The UE may, for example, cause the NDDS to reselect to the first SCell.

In some cases, the UE 804 determines whether a BWP of the PCell of the DDS overlaps with a paging search space associated with the one or more paging messages, as shown at 820. In some cases, when the UE 804 determines at 820 the BWP of the PCell of the DDS overlaps with the paging search space, the UE 804 determines a first signal to noise (SNR) associated with the PCell and a second SNR associated with the one or more SCells, as shown at 822. In some cases, when the UE 804 determines at 820 the BWP of the PCell of the DDS does not overlap with the paging search space or when the first SNR associated with the PCell, determined at 822, is below a first threshold and the second SNR associated with the one or more SCells, also determined at 822, is above a second threshold, the UE 804 selects, for the nDDS, the first SCell from the one or more SCells based on a determination that a BWP of the first SCell overlaps with the paging search space, as shown at 824.

In some cases, the UE 804 selects the first SCell at 824 further based on an indication in a system information block (SIB) of the first SCell indicating that the paging search space is within the BWP of the first SCell (e.g., the paging search space of the CORESET0 is within the BWP1 640, shown in FIG. 6). The SIB may, for example, be received at 808. In some cases, the indication in the SIB indicating that the paging search space is within the BWP of the first SCell comprises an indication that the BWP of the first SCell contains a control resource set 0 (CORESET0). For example, the UE 804 may determine the SIB indicates that CORESET0 is within a BWP and determine that the paging search space is within the BWP, based on CORESET0 being within the BWP.

In some cases, the UE 804 selects the first SCell at 824 further based on a bandwidth of the BWP of the first SCell being larger than a bandwidth of a BWP of another SCell of the one or more SCells. That is, when the UE 804 determines that BWPs of multiple SCells contain a paging search space, the UE may select the SCell having the largest BWP, based on that bandwidth.

In some cases, if the DDS is in a deactivated state on the first SCell, the UE 804 may receive, at 812, a physical downlink control channel (PDCCH) during a paging occasion of the nDDS and decode, at 814, the PDCCH using a paging radio network temporary identifier (P-RNTI) of the nDDS.

In some cases, if the DDS is in an activated state on the first SCell and the first SCell does not use cross-carrier scheduling, the UE 804 may receive PDCCHs using the first SCell and attempt to decode, at 814, PDCCHs that are received, at 812, during a PO of the nDDS using a P-RNTI of the nDDS, while decoding PDCCHs received outside of a PO using other RNTIs of the UE.

In some cases, if the DDS is in an activated state on the first SCell and the first SCell uses cross-carrier scheduling, the UE 804 may receive PDCCHs using the first SCell but only attempt to decode the PDCCHs received, at 812, during a PO of the nDDS using a P-RNTI of the nDDS while not attempting to decode the PDCCHs received outside of a PO, as the PDCCHs received outside of a PO may also be received on the PCC (via the cross-carrier scheduling).

In some cases, the UE 804 may receive the one or more paging messages at 812 in the paging search space using the DDS and the SCC associated with the first SCell while the nDDS is in the idle mode, those one or more paging messages may be associated with the nDDS, and the UE 804 may then decode those paging messages at 814.

In some cases, the UE 804 may receive the one or more paging messages at 812 in the paging search space using the DDS and the PCC associated with the PCell while the nDDS is in the idle mode, and the UE 804 may then decode those paging messages at 814.

In some cases, the UE 804 may include only a first SIM associated with the DDS. In some cases, the UE 804 may be a multi-SIM UE, with a first SIM associated with the DDS and a second SIM associated with the nDDS, and the DDS and nDDS may be associated with different network operators.

In some cases, the UE 804 may receive a SIB of the first SCell, at 808, indicating that the paging search space is within the BWP of the first SCell, and the UE 804 may select, at 826 and based on the SIB, the first SCell from the one or more SCells to decode the one or more paging messages. In some cases, the UE 804 may select the first SCell at 826 based further on the first SCell having a greatest signal to noise ratio (SNR) among the one or more SCells. In some cases, the UE 804 may select the first SCell at 826 based further on a TAC of the first SCell, which the UE 804 may match to a TAC of the PCell.

In some cases, the UE 804 may determine an SNR of a PCC associated with the PCell at 828. In some cases, when the TAC of the first SCell is the same as a TAC of the PCell and when the SNR of the PCC associated with the PCell is less than a threshold SNR, the UE 804 may receive the one or more paging messages using the PCC associated with the PCell and using the SCC associated with the first SCell, at 830. The UE 804 may then decode, at 814, the one or more paging messages received using the PCC associated with the PCell and using the SCC associated with the first SCell.

Example Operations of a User Equipment

Figure 9:
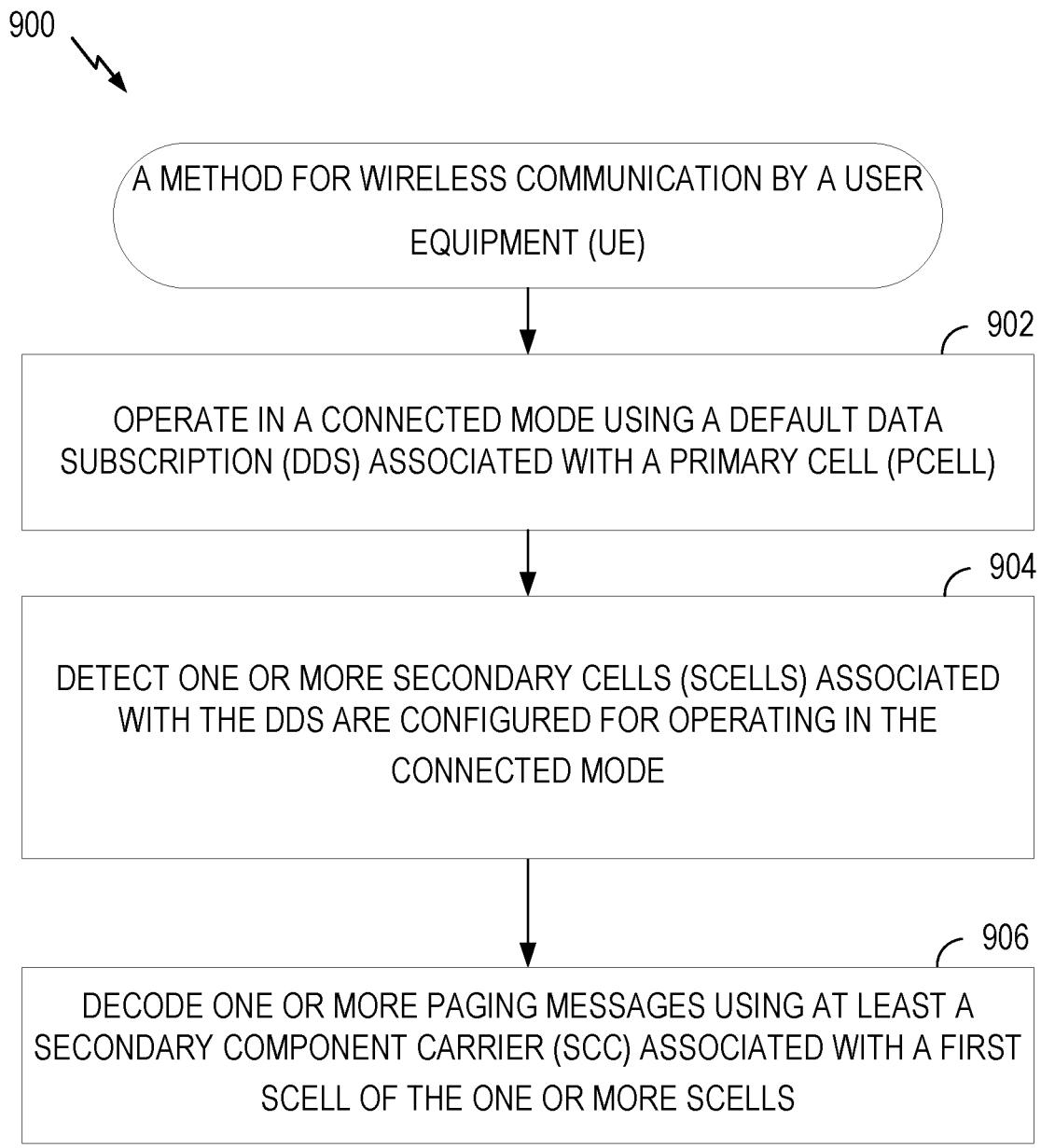
FIG. 9 depicts a method for wireless communications.

FIG. 9 shows a method 900 for wireless communications by a UE, such as UE 104 of FIGS. 1 and 3.

Method 900 begins at 902 with operating in a connected mode using a default data subscription (DDS) associated with a primary cell (PCell). For example, UE 104 (see FIG. 1) may operate in a connected mode using a DDS associated with a PCell 110.

Method 900 then proceeds to step 904 with detecting one or more secondary cells (SCells) associated with the DDS are configured for operating in the connected mode. Continuing the example from above, the UE 104 may detect one or more SCells (which may, for example, be supported by BS 102) associated with the DDS are configured for operating in the connected mode.

Method 900 then proceeds to step 906 with decoding one or more paging messages using at least a secondary component carrier (SCC) associated with a first SCell of the one or more SCells. Continuing the example from above, the UE 104 may decode one or more paging messages using at least an SCC associated with a first SCell (which may, for example, be supported by BS 102) of the one or more SCells.

In some cases, the UE may include at least a first SIM and a second SIM. In some such cases, the first SIM is associated with the DDS and the second SIM is associated with a nDDS. In some such cases, the DDS and the nDDS are associated with a same network operator.

In some such cases, method 900 further includes operating in an idle mode using the nDDS. In some such cases, method 900 further includes determining that a bandwidth part (BWP) of the PCell of the DDS overlaps with a paging search space associated with the one or more paging messages. In some such cases, method 900 further includes determining a first signal to noise (SNR) associated with the PCell and determining a second SNR associated with the one or more SCells. In some such cases, when the first SNR associated with the PCell is below a first threshold and the second SNR associated with the one or more SCells is above a second threshold, method 900 further includes selecting, for the nDDS, the first SCell from the one or more SCells based on a determination that a BWP of the first SCell overlaps with the paging search space.

In some cases, selecting the first SCell may be further based on an indication in a system information block (SIB) of the first SCell indicating that the paging search space is within the BWP of the first SCell. In some such cases the indication in the SIB indicating that the paging search space is within the BWP of the first SCell may include an indication that the BWP of the first SCell contains a control resource set 0 (CORESET0). In some such cases, selecting the first SCell may be further based on a bandwidth of the BWP of the first SCell being larger than a bandwidth of a BWP of another SCell of the one or more SCells.

In some cases, the DDS is in a deactivated state on the first SCell, and method 900 further includes receiving a physical downlink control channel (PDCCH) using the first SCell during a paging occasion (PO) of the nDDS, while ignoring other PDCCHs on the first SCell outside of the PO. In such cases, method 900 may further include decoding the PDCCH using a paging radio network temporary identifier (P-RNTI) of the nDDS.

In some cases, the DDS is in an activated state on the first SCell, and the first SCell does not use cross-carrier scheduling. In such cases, method 900 may further include receiving one or more PDCCHs using the first SCell. In such cases, method 900 may further include attempting to decode a PDCCH, of the one or more PDCCHs, received during a PO of the nDDS using a paging radio network temporary identifier (P-RNTI) of the nDDS.

In some cases, the DDS is in an activated state on the first SCell, and the first SCell uses cross-carrier scheduling. In such cases, the method 900 further includes receiving one or more PDCCHs using the first SCell and attempting to decode at least one of the one or more PDCCHs received during a PO of the nDDS using a P-RNTI of the nDDS, while not attempting to decode any of the one or more PDCCHs received outside of the PO.

In some cases, method 900 further includes receiving, while the nDDS is in the idle mode, the one or more paging messages in the paging search space using the DDS and the SCC associated with the first SCell. In such cases, the one or more paging messages may be associated with the nDDS, and decoding the one or more paging messages may be based on the one or more paging messages received using the DDS and the SCC associated with the first SCell. In some such cases, method 900 further includes receiving, while the nDDS is in the idle mode, the one or more paging messages in the paging search space using the DDS and a primary component carrier (PCC) associated with the PCell, and decoding at step 906 may include decoding the one or more paging messages received using the DDS and the PCC associated with the PCell.

In some cases, the UE includes only a first SIM associated with the DDS. In some cases, the UE includes at least a first SIM and a second SIM. In such cases, method 900 may further include receiving a SIB of the first SCell indicating that the paging search space is within the BWP of the first SCell. In such cases, method 900 may further include selecting, based on the SIB, the first SCell from the one or more SCells to decode the one or more paging messages.

In some such cases, selecting the first SCell may be based on the first SCell having a greatest SNR among the one or more SCells. In some such cases, selecting the first SCell may be further based on a TAC of the first SCell. In some such cases, method 900 may further include determining an SNR of a PCC associated with the PCell. In some such cases, when the TAC of the first SCell is the same as a TAC of the PCell and when the SNR of the PCC associated with the PCell is less than a threshold SNR, method 900 may further include receiving the one or more paging messages using the PCC associated with the PCell and using the SCC associated with the first SCell. In some such cases, decoding the one or more paging messages at step 906 includes decoding the one or more paging messages received using the PCC associated with the PCell and using the SCC associated with the first SCell.

Figure 10:
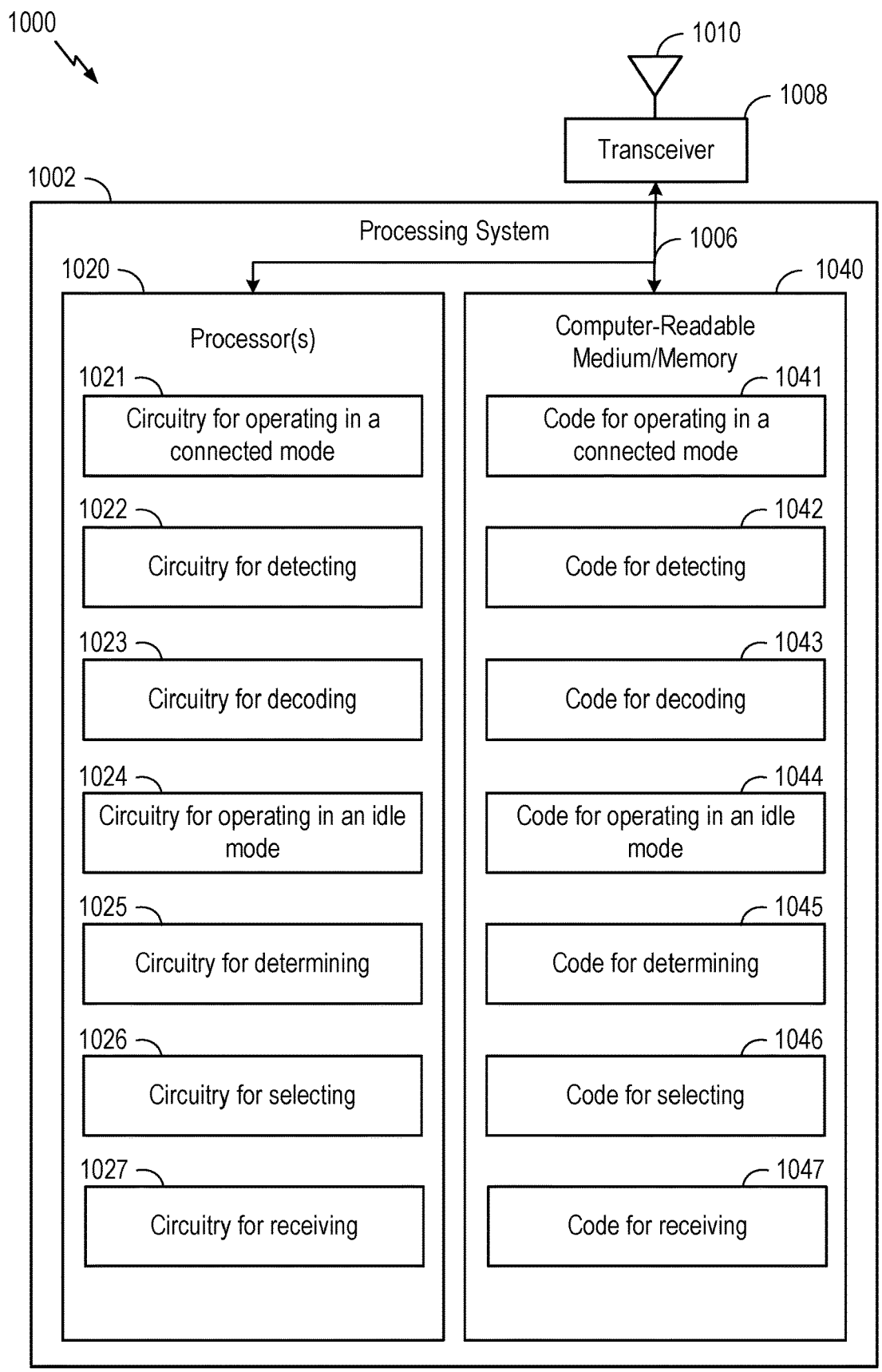
FIG. 10 depicts aspects of an example communications device.

In one aspect, method 900, or any aspect related to it, may be performed by an apparatus, such as communications device 1000 of FIG. 10, which includes various components operable, configured, or adapted to perform the method 900. Apparatus 1000 is described below in further detail.

Note that FIG. 9 is just one example of a method, and other methods including fewer, additional, or alternative steps are possible consistent with this disclosure.

Example Communications Devices

FIG. 10 depicts aspects of an example communications device 1000. In some aspects, communications device 1000 is a user equipment, such as UE 104 described above with respect to FIGS. 1 and 3.

The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes one or more processors 1020. In various aspects, the one or more processors 1020 may be representative of one or more of receive processor 358, transmit processor 364, TX MIMO processor 366, and/or controller/processor 380, as described with respect to FIG. 3. The one or more processors 1020 are coupled to a computer-readable medium/memory 1030 via a bus 1006. In certain aspects, the computer-readable medium/memory 1030 is configured to store instructions (e.g., computer-executable code) that when executed by the one or more processors 1020, cause the one or more processors 1020 to perform the method 900 described with respect to FIG. 9, or any aspect related to it. Note that reference to a processor performing a function of communications device 1000 may include one or more processors performing that function of communications device 1000.

In the depicted example, computer-readable medium/memory 1040 stores code (e.g., executable instructions) for operating in a connected mode 1041, code for detecting 1042, code for decoding 1043, code for operating in an idle mode 1044, code for determining 1045, code for selecting 1046, and code for receiving 1047. Processing of the code 1041-1047 may cause the communications device 1000 to perform the method 900 described with respect to FIG. 9, or any aspect related to it.

The one or more processors 1020 include circuitry configured to implement (e.g., execute) the code stored in the computer-readable medium/memory 1040, including circuitry for operating in a connected mode 1021, circuitry for detecting 1022, circuitry for decoding 1023, circuitry for operating in an idle mode 1024, circuitry for determining 1025, circuitry for selecting 1026, and circuitry for receiving 1027. Processing with circuitry 1021-1027 may cause the communications device 1000 to perform the method 900 described with respect to FIG. 9, or any aspect related to it.

Various components of the communications device 1000 may provide means for performing the method 900 described with respect to FIG. 9, or any aspect related to it. For example, means for transmitting, sending or outputting for transmission may include the transceivers 354 and/or antenna(s) 352 of the UE 104 illustrated in FIG. 3 and/or transceiver 1008 and antenna 1010 of the communications device 1000 in FIG. 10. Means for receiving or obtaining may include the transceivers 354 and/or antenna(s) 352 of the UE 104 illustrated in FIG. 3 and/or transceiver 1008 and antenna 1010 of the communications device 1000 in FIG. 10.

Example Clauses

Implementation examples are described in the following numbered clauses:

Clause 1: A method for wireless communication by a user equipment (UE), comprising: operating in a connected mode using a default data subscription (DDS) associated with a primary cell (PCell); detecting one or more secondary cells (SCells) associated with the DDS are configured for operating in the connected mode; and decoding one or more paging messages using at least a secondary component carrier (SCC) associated with a first SCell of the one or more SCells.

Clause 2: The method of clause 1, wherein: the UE includes at least a first subscriber identification module (SIM) and a second SIM, the first SIM is associated with the DDS and the second SIM is associated with a non-default data subscription (nDDS), and the DDS and the nDDS are associated with a same network operator.

Clause 3: The method of clause 2, further comprising operating in an idle mode using the nDDS.

Clause 4: The method of clause 3, further comprising determining whether a bandwidth part (BWP) of the PCell of the DDS overlaps with a paging search space associated with the one or more paging messages.

Clause 5: The method of clause 4, further comprising: when, based on the determination, the BWP of the PCell of the DDS overlaps with the paging search space: determining a first signal to noise (SNR) associated with the PCell; and determining a second SNR associated with the one or more SCells.

Clause 6: The method of clause 5, further comprising: when, based on the determination, the BWP of the PCell of the DDS does not overlap with the paging search space or when the first SNR associated with the PCell is below a first threshold and the second SNR associated with the one or more SCells is above a second threshold, selecting, for the nDDS, the first SCell from the one or more SCells based on a determination that a BWP of the first SCell overlaps with the paging search space.

Clause 7: The method of clause 6, wherein the selecting the first SCell is further based on an indication in a system information block (SIB) of the first SCell indicating that the paging search space is within the BWP of the first SCell.

Clause 8: The method of clause 7, wherein the indication in the SIB indicating that the paging search space is within the BWP of the first SCell comprises an indication that the BWP of the first SCell contains a control resource set 0 (CORESET0).

Clause 9: The method of clause 6, wherein the selecting the first SCell is further based on a bandwidth of the BWP of the first SCell being larger than a bandwidth of a BWP of another SCell of the one or more SCells.

Clause 10: The method of clause 6, wherein: the DDS is in a deactivated state on the first SCell, and the method further comprises: receiving a physical downlink control channel (PDCCH) using the first SCell during a paging occasion (PO) of the nDDS, while ignoring other PDCCHs on the first SCell outside of the PO; and decoding the PDCCH using a paging radio network temporary identifier (P-RNTI) of the nDDS.

Clause 11: The method of clause 6, wherein: the DDS is in an activated state on the first SCell, the first SCell does not use cross-carrier scheduling, and the method further comprises: receiving one or more physical downlink control channels (PDCCHs) using the first SCell; and attempting to decode the one or more PDCCHs, wherein attempting to decode the one or more PDCCHs comprises attempting to decode a PDCCH, of the one or more PDCCHs, received during a paging occasion (PO) of the nDDS using a paging radio network temporary identifier (P-RNTI) of the nDDS.

Clause 12: The method of clause 6, wherein: the DDS is in an activated state on the first SCell, the first SCell uses cross-carrier scheduling, and the method further comprises: receiving one or more physical downlink control channel (PDCCHs) using the first SCell; and attempting to decode at least one of the one or more PDCCHs received during a paging occasion (PO) of the nDDS using a paging radio network temporary identifier (P-RNTI) of the nDDS, while not attempting to decode any of the one or more PDCCHs received outside of the PO.

Clause 13: The method of clause 6, further comprising receiving, while the nDDS is in the idle mode, the one or more paging messages in the paging search space using the DDS and the SCC associated with the first SCell, wherein: the one or more paging messages are associated with the nDDS, and decoding the one or more paging messages is based on the one or more paging messages received using the DDS and the SCC associated with the first SCell.

Clause 14: The method of clause 13, further comprising receiving, while the nDDS is in the idle mode, the one or more paging messages in the paging search space using the DDS and a primary component carrier (PCC) associated with the PCell, wherein decoding the one or more paging messages is based on the one or more paging messages received using the DDS and the PCC associated with the PCell.

Clause 15: The method of clause 1, wherein: the UE includes only a first subscriber identification module (SIM) associated with the DDS, or the UE includes at least a first subscriber identification module (SIM) and a second SIM and wherein: the first SIM is associated with the DDS and the second SIM is associated with a non-default data subscription (nDDS), and the DDS and the nDDS are associated with a different network operators.

Clause 16: The method of clause 15, further comprising: receiving a system information block (SIB) of the first SCell indicating that the paging search space is within the BWP of the first SCell; and selecting, based on the SIB, the first SCell from the one or more SCells to decode the one or more paging messages.

Clause 17: The method of clause 16, wherein selecting the first SCell is based on the first SCell having a greatest signal to noise ratio (SNR) among the one or more SCells.

Clause 18: The method of clause 17, wherein the selecting the first SCell is further based on a tracking area code (TAC) of the first SCell.

Clause 19: The method of clause 18, further comprising determining signal to noise ratio (SNR) of a primary component carrier (PCC) associated with the PCell.

Clause 20: The method of clause 19, further comprising receiving, when the TAC of the first SCell is the same as a TAC of the PCell and when the SNR of the PCC associated with the PCell is less than a threshold SNR: receiving the one or more paging messages using the PCC associated with the PCell; and receiving the one or more paging messages using the SCC associated with the first SCell.

Clause 21: The method of clause 20, wherein decoding the one or more paging messages is based on the one or more paging messages received using the PCC associated with the PCell and using the SCC associated with the first SCell.

Clause 22: An apparatus, comprising: a memory comprising executable instructions; and a processor configured to execute the executable instructions and cause the apparatus to perform a method in accordance with any one of clauses 1-21.

Clause 23: An apparatus, comprising means for performing a method in accordance with any one of clauses 1-21.

Clause 24: A non-transitory computer-readable medium comprising executable instructions that, when executed by a processor of an apparatus, cause the apparatus to perform a method in accordance with any one of clauses 1-21.

Clause 25: A computer program product embodied on a computer-readable storage medium comprising code for performing a method in accordance with any one of clauses 1-21.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
operating in a connected mode using a default data subscription (DDS) associated with a primary cell (PCell) and a first subscriber identification module (SIM);
operating in an idle mode using a non-default data subscription (nDDS) associated with a second SIM, wherein the DDS and the nDDS are associated with a same network operator;
detecting one or more secondary cells (SCells) associated with the DDS are configured for operating in the connected mode;
determining whether a bandwidth part (BWP) of the PCell of the DDS overlaps with a paging search space associated with one or more paging messages; and
decoding, based in part on the determination, the one or more paging messages using at least a secondary component carrier (SCC) associated with a first SCell of the one or more SCells.

2. The method of claim 1, further comprising:
when, based on the determination, the BWP of the PCell of the DDS overlaps with the paging search space:
determining a first signal to noise (SNR) associated with the PCell; and
determining a second SNR associated with the one or more SCells.

3. The method of claim 2, further comprising:
when, based on the determination, the BWP of the PCell of the DDS does not overlap with the paging search space or when the first SNR associated with the PCell is below a first threshold and the second SNR associated with the one or more SCells is above a second threshold:
selecting, for the nDDS, the first SCell from the one or more SCells based on a determination that a BWP of the first SCell overlaps with the paging search space.

4. The method of claim 3, wherein the selecting the first SCell is further based on an indication in a system information block (SIB) of the first SCell indicating that the paging search space is within the BWP of the first SCell.

5. The method of claim 4, wherein the indication in the SIB indicating that the paging search space is within the BWP of the first SCell comprises an indication that the BWP of the first SCell contains a control resource set 0 (CORESET0).

6. The method of claim 3, wherein the selecting the first SCell is further based on a bandwidth of the BWP of the first SCell being larger than a bandwidth of a BWP of another SCell of the one or more SCells.

7. The method of claim 3, wherein:
the DDS is in a deactivated state on the first SCell, and the method further comprises:
receiving a physical downlink control channel (PDCCH) using the first SCell during a paging occasion (PO) of the nDDS, while ignoring other PDCCHs on the first SCell outside of the PO; and
decoding the PDCCH using a paging radio network temporary identifier (P-RNTI) of the nDDS.

8. The method of claim 3, wherein:
the DDS is in an activated state on the first SCell,
the first SCell does not use cross-carrier scheduling, and the method further comprises:
receiving one or more physical downlink control channels (PDCCHs) using the first SCell; and
attempting to decode the one or more PDCCHs, wherein attempting to decode the one or more PDCCHs comprises attempting to decode a PDCCH, of the one or more PDCCHs, received during a paging occasion (PO) of the nDDS using a paging radio network temporary identifier (P-RNTI) of the nDDS.

9. The method of claim 3, wherein:
the DDS is in an activated state on the first SCell,
the first SCell uses cross-carrier scheduling, and
the method further comprises:
receiving one or more physical downlink control channel (PDCCHs) using the first SCell; and
attempting to decode at least one of the one or more PDCCHs received during a paging occasion (PO) of the nDDS using a paging radio network temporary identifier (P-RNTI) of the nDDS, while not attempting to decode any of the one or more PDCCHs received outside of the PO.

10. The method of claim 3, further comprising receiving, while the nDDS is in the idle mode, the one or more paging messages in the paging search space using the DDS and the SCC associated with the first SCell, wherein:
the one or more paging messages are associated with the nDDS, and
decoding the one or more paging messages is based on the one or more paging messages received using the DDS and the SCC associated with the first SCell.

11. A user equipment (UE) configured for wireless communications, comprising:
one or more processors configured to execute instructions stored on one or more memories to cause the UE to:
operate in a connected mode using a default data subscription (DDS) associated with a primary cell (PCell) and a first subscriber identification module (SIM);
operate in an idle mode using a non-default data subscription (nDDS) associated with a second SIM, wherein the DDS and the nDDS are associated with a same network operator;
detect one or more secondary cells (SCells) associated with the DDS are configured for operating in the connected mode;
determine whether a bandwidth part (BWP) of the PCell of the DDS overlaps with a paging search space associated with one or more paging messages; and
decode, based in part on the determination, one or more paging messages using at least a secondary component carrier (SCC) associated with a first SCell of the one or more SCells.

12. A non-transitory computer-readable medium, comprising:
computer-executable instructions that, when executed by one or more processors of a user equipment (UE), cause the UE to:
operate in a connected mode using a default data subscription (DDS) associated with a primary cell (PCell) and a first subscriber identification module (SIM);
operate in an idle mode using a non-default data subscription (nDDS) associated with a second SIM, wherein the DDS and the nDDS are associated with a same network operator;
detect one or more secondary cells (SCells) associated with the DDS are configured for operating in the connected mode;

determine whether a bandwidth part (BWP) of the PCell of the DDS overlaps with a paging search space associated with one or more paging messages; and decode, based in part on the determination, one or more paging messages using at least a secondary component carrier (SCC) associated with a first SCell of the one or more SCells.

\* \* \* \* \*